US010511931B1

(12) United States Patent
Khawand et al.

(10) Patent No.: US 10,511,931 B1
(45) Date of Patent: Dec. 17, 2019

(54) DETECTING MOVEMENT OF A COMPUTING DEVICE BASED ON WIRELESS ACCESS POINT SIGNAL STRENGTH DATA AND ADAPTIVE THRESHOLDS

(71) Applicant: Microsoft Technology Licensing, LLC, Redmond, WA (US)

(72) Inventors: Jean Khawand, Sammamish, WA (US); Gianluigi Nusca, Redmond, WA (US); Matthew T. Durak, Redmond, WA (US); Jorge A. González Martinez, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/990,520

(22) Filed: May 25, 2018

(51) Int. Cl.
*H04W 4/02* (2018.01)
*H04B 17/318* (2015.01)

(52) U.S. Cl.
CPC ............ *H04W 4/02* (2013.01); *H04B 17/318* (2015.01)

(58) Field of Classification Search
CPC ................................ H04W 4/02; H04B 17/318
See application file for complete search history.

(56) References Cited

U.S. PATENT DOCUMENTS

| 7,974,598 | B2 * | 7/2011 | Kong | .................... | H04B 17/318 455/135 |
| 8,155,081 | B1 * | 4/2012 | Mater | ...................... | H04W 4/04 370/254 |
| 9,430,781 | B1 | 8/2016 | Kerr et al. | | |
| 9,521,648 | B1 * | 12/2016 | Kolekar | ................. | H04W 64/00 |
| 2003/0061364 | A1 * | 3/2003 | Banerjee | ................. | H04L 12/14 709/229 |
| 2010/0097269 | A1 * | 4/2010 | Loidl | .................... | G01C 21/206 342/378 |
| 2010/0113061 | A1 * | 5/2010 | Holcman | .............. | G01S 5/0252 455/456.1 |
| 2011/0047301 | A1 | 2/2011 | Yu et al. | | |
| 2013/0260693 | A1 * | 10/2013 | Un | ............................ | G01S 5/02 455/67.11 |
| 2015/0024786 | A1 | 1/2015 | Asrani et al. | | |

(Continued)

OTHER PUBLICATIONS

"International Search Report and Written Opinion Issued in PCT Application No. PCT/US19/031935", dated Jul. 12, 2019, 15 Pages.

*Primary Examiner* — Muthuswamy G Manoharan

(57) ABSTRACT

The disclosure herein describes receiving wireless signal strength data and detecting movement of a computing device relative to wireless access points based thereon. The computing device receives a signal strength data stream based on a wireless signal from a wireless access point. A signal strength range is determined based on the signal strength data stream during a learning time period while the computing device is within a defined area. The signal strength range indicates that the computing device is within the defined area associated with the wireless access point. During a detection time period, signal strength values outside of the signal strength range are detected and, based on the detected values, a notification is provided that indicates the computing device has moved outside the defined area. The described movement detection method provides rapid detection of movements of a computing device using already-obtained data that does not rely on interaction with other devices.

20 Claims, 6 Drawing Sheets

(56) References Cited

U.S. PATENT DOCUMENTS

| | | | |
|---|---|---|---|
| 2016/0366135 A1* | 12/2016 | Furuichi | H04L 41/085 |
| 2016/0373926 A1* | 12/2016 | Bahadirov | H04L 12/282 |
| 2017/0013667 A1* | 1/2017 | Yang | H04L 43/10 |
| 2017/0064567 A1 | 3/2017 | Ponnuswamy | |
| 2017/0207800 A1* | 7/2017 | Garrett | H04W 76/15 |
| 2018/0077526 A1 | 3/2018 | Lerner et al. | |
| 2018/0102032 A1* | 4/2018 | Emmanuel | H04W 28/04 |

* cited by examiner

DETECTING MOVEMENT OF A COMPUTING DEVICE BASED ON WIRELESS ACCESS POINT SIGNAL STRENGTH DATA AND ADAPTIVE THRESHOLDS

BACKGROUND

For certain software applications, it is valuable to be able to determine when a device is moving between general locations and/or areas. For instance, when applications of a device are using wireless network connections associated with specific wireless access points, detecting movement of the device into, out of, and within areas associated with effective ranges of the wireless access points (e.g., a "walk-away" situation, etc.) enables software applications to handle connectivity changes that may result from the movement of the device in relation to the wireless access points. However, use of location-finding technology, such as global positioning system (GPS) technology may require high levels of processing, may not provide the desired level of location granularity, and may fail to work reliably indoors. Further, interaction by the device with other devices is required in GPS systems, creating a reliance on such devices. Other location-finding technology, such as 802.11mc location-finding, may require substantial processing on the device.

For example, during a media projection session using a wireless network connection to share media to others in a defined location (e.g., a conference room, etc.), current technology enables users to project a display of their device, leave to another room, and continue projecting the display without realizing that they are still projecting. The user may then use their device to view personal, private, or otherwise confidential information, resulting in the user unintentionally projecting the information in the defined location.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for detecting movement of a computing device based on signal strength data from wireless access points is described. The computing device receives, via the wireless network interface, a signal strength data stream based on a wireless signal from a wireless access point. A signal strength range is then determined based on the signal strength data stream during a learning time period. The signal strength range indicates that the computing device is within a defined area associated with the wireless access point. During a detection time period, signal strength values that are outside of the signal strength range are detected and, based on the detected signal strength values, a notification is provided that indicates the computing device has moved outside the area associated with the connected wireless access point.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a system and method for detecting movement of a computing device into and/or out of an area associated with a wireless access point based on analysis of wireless signal strength data. The computing device receives a signal strength data stream based on a wireless signal from a wireless access point. During a learning time period, the signal strength data stream is used to determine a signal strength range. The signal strength range indicates that the computing device is within a defined area associated with, or otherwise near, the wireless access point. The area is defined, for example, based on physical characteristics such as boundaries of a room, a portion of a room, etc. In some embodiments, the signal strength range is a subset of the overall signal strength range that the computing device may observe while connected to the wireless access point (e.g., even when the computing device is outside the defined area). During a detection time period, signal strength values of the signal strength data stream that are outside of the signal strength range are detected and, based on the detected signal strength values, a notification is provided that indicates the computing device has moved outside the defined area associated with the connected wireless access point. For example, the computing device may receive the notification even though the computing device is still connected to the wireless access point.

Various scenarios are described herein. For example, the described movement detection system provides developers with a flexible platform, including adaptive thresholds, with which to handle "walk-away" situations and other similar movement events. Further, the system provides users with a user-friendly, efficient notification system for maintaining network connections and associated application sessions as described herein. The signal strength data used to detect movement is data that is already available to many modern computing devices, and the analysis of the signal strength data does not require or rely upon any other computing devices (e.g., cloud- or satellite-based devices). The analysis can be done rapidly and efficiently, and detection parameters may be adjusted based on feedback, resulting in increasing accuracy in movement detection. The processor, memory, and network interface(s) of the movement detection system operate in an unconventional way to make use of the received signal strength data to determine signal strength ranges associated with defined areas related to wireless access points and to detect movement of computing devices within the defined areas based on analysis of the signal strength data.

Figure 1:
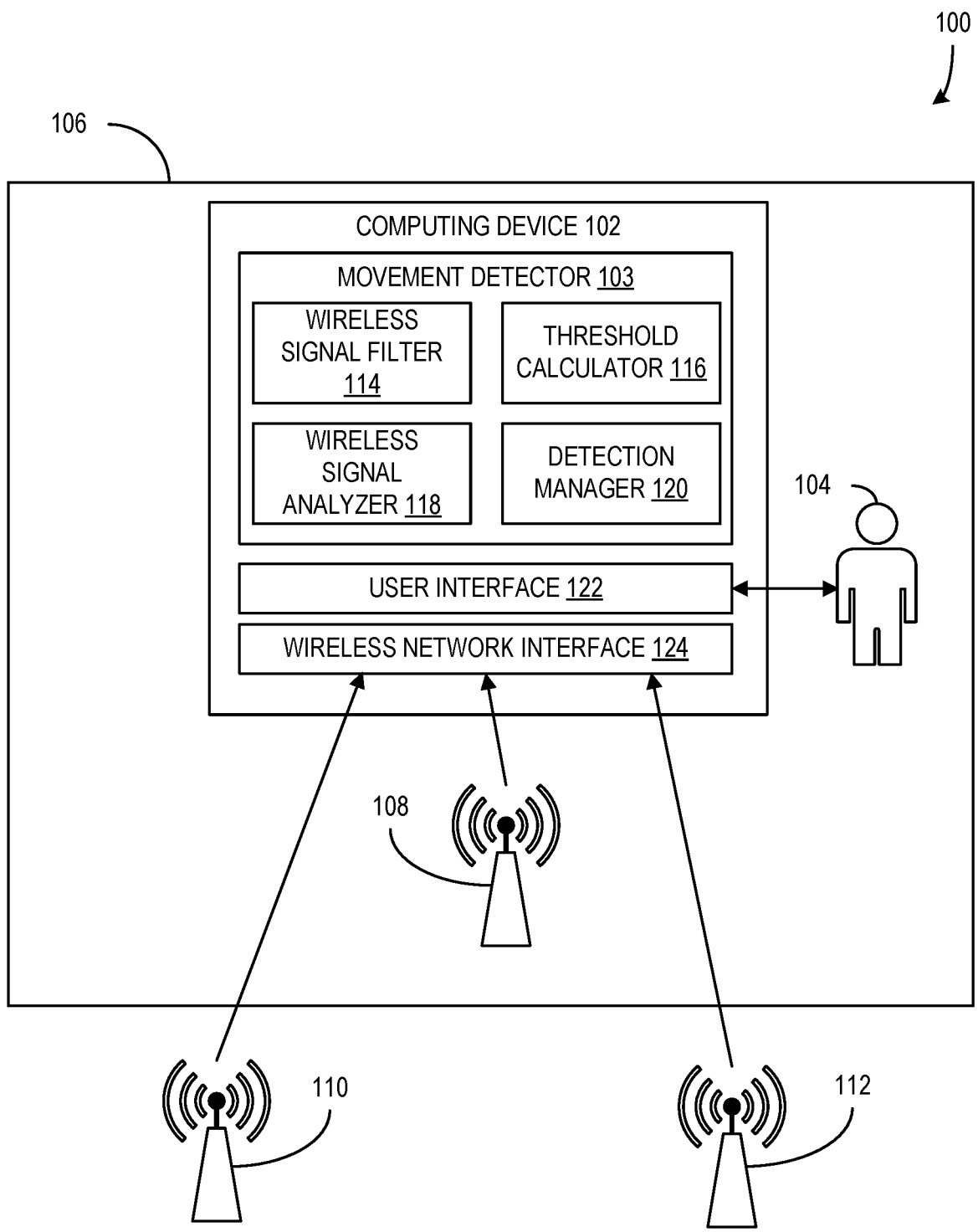
FIG. 1 is an exemplary block diagram illustrating a system configured for detecting movement of a computing device based on wireless signals according to an embodiment.

FIG. 1 is an exemplary block diagram illustrating a system 100 configured for detecting movement of a computing device 102 based on wireless signals according to an embodiment. The computing device 102 is used by a user 104 in an area 106 (e.g., a conference room, office, or other room, outdoor area, etc.). The area 106 includes a wireless access point 108 (e.g., a wireless router, etc.) that emits wireless signals that are received by the computing device 102. Outside of the area 106, wireless access points 110 and 112 may also be present and emit wireless signals that are received by the computing device 102 as illustrated, in addition to the computing device 102 receiving wireless signals from the wireless access point 108. In some examples, the computing device 102 is configured to create and/or maintain a wireless network connection via the wireless access point 108 as understood by a person of ordinary skill in the art. Alternatively, or additionally, the computing device 102 may be configured to create and/or maintain wireless network connections via the wireless access point 110 and/or the wireless access point 112. It should be understood that, in other examples, the system 100 may include more, fewer, or different wireless access points in different configurations, arrangements, or the like without departing from the description herein.

The computing device 102 includes a movement detector 103. The movement detector 103 is a component of the computing device 102 that includes hardware, firmware, and/or software sub-components configured for detecting movement of the computing device 102 as described herein. the movement detector 103 includes a wireless signal filter 114, a threshold calculator 116, a wireless signal analyzer 118, and a detection manager 120.

The computing device 102 further includes a user interface 122 and a wireless network interface 124. The interfaces 122 and 124 are components of the computing device 102 that include hardware, firmware, and/or software sub-components configured for interacting with users and wireless network entities, respectively.

In some examples, the user interface 122 includes a visual output interface (e.g., a screen, a display, lights or other indicators, etc.), an audio output interface (e.g., speakers, etc.), physical input interface (e.g., touchscreen, buttons, keys, switches, etc.), and/or audio input interface (e.g., microphone, etc.). The user interface 122 may include more, fewer, or different interfaces without departing from the description herein. The user interface 122 is further configured to interact with other components of the computing device (e.g., the movement detector 103, other applications, etc.), enabling user input to be transferred to the other components and enabling output from other components to be transferred to the user.

In some examples, the wireless network interface 124 includes interface components configured to send and/or receive wireless signals (e.g., antennae, wireless radio components, etc.), components to interpret or otherwise transform raw wireless signal data into usable data formats and/or transform data into wireless signal data for transmission, and/or components to transfer data to and from other applications (e.g., the movement detector 103, etc.). The wireless network interface 124 may be configured to enable the creation and maintenance of connections between applications local to the computing device 102 and other entities that are accessible via wireless networks that are in range of and compatible with the wireless network interface 124. For instance, the movement detector 103 or other applications of the computing device 102 (e.g., a projection application, email or messaging application, web browser application, etc.) may create and maintain network connections with other entities (e.g., web servers, other computing devices, cloud data stores, etc.) using the wireless network interface 124 and one or more of the wireless access points 108, 110, and 112.

In some examples, the wireless access points 108, 110, and 112 are configured to operate using a Wi-Fi communication protocol. Alternatively, or additionally, the wireless access points 108, 110, and/or 112 may be configured to operate using a cellular-based communication protocol, Bluetooth communication protocol, or other short- or long-range wireless communication protocols as understood by a person of ordinary skill in the art.

Returning to the sub-components of the movement detector 103, the wireless signal filter 114 is configured for filtering raw wireless signal data from the wireless network interface 124 to create filtered wireless signal data (e.g., a wireless signal data stream as described herein, etc.). The wireless signal filter 114 may include hardware-based analog filter components, software-based digital filter components, filter configuration software components, etc. In some examples, the wireless signal filter 114 includes a configurable low pass filter that is configured for filtering noise out of the wireless signals received from the wireless access points 108, 110, and/or 112. The functionality of the wireless signal filter 114 is described in greater detail below with respect to FIG. 2 and elsewhere herein.

The threshold calculator 116 is configured for identifying thresholds of received wireless signals (e.g., frequency thresholds, signal strength thresholds, signal quality thresholds, other signal-based parameter thresholds, etc.) associated with the current location of the computing device 102. The parameter values associated with a wireless signal from a wireless access point (e.g., wireless access points 108, 110, and 112, etc.) may be based, at least in part, on the relative location of the computing device 102 to the source wireless access point. For instance, the signal strength associated with a wireless signal of a wireless access point at the computing device 102 may be stronger when the computing device 102 is close to the wireless access point than when the computing device 102 is farther away from the wireless access point. Alternatively, or additionally, the presence of walls and/or other obstructions between the wireless access point and the computing device 102 may inhibit the wireless signal such that the signal strength at the computing device 102 is reduced. The threshold calculator 116 is configured to monitor received wireless signal(s) over a period of time (e.g., a learning time period, etc.) and calculate the thresholds (e.g. a maximum threshold and a minimum threshold, etc.) based on monitored signal parameter values. For instance, if, during a learning time period, while the computing device 102 is within a defined or desired area proximate to the wireless access point, the signal strength of a monitored wireless signal reaches a maximum value of 70 and a minimum value of 63 on a received signal strength indicator (RSSI) scale, the threshold calculator 116 may calculate maximum and minimum thresholds of 70 and 63 respectively. The operation of the threshold calculator 116 is described in greater detail below with respect to FIG. 2 and elsewhere herein.

The wireless signal analyzer 118 is configured to analyze received wireless signal data with respect to calculated thresholds from the threshold calculator 116. The analysis of the wireless signal data may occur over the course of a defined period of time (e.g., a detection time period, etc.). In some examples, the analysis of the wireless signal analyzer 118 indicates that the computing device 102 has or has not moved substantially based on the received wireless signal data. For instance, when the received wireless signal data is outside of the calculated thresholds or otherwise fails to satisfy the calculated thresholds during the detection time period, the wireless signal analyzer may indicate that the computing device 102 has moved to another location. The operation of the wireless signal analyzer 118 is described in greater detail below with respect to FIG. 2 and elsewhere herein.

The detection manager 120 is configured to manage the operation of the other components of the movement detector 103 and to set the current operating state of the movement detector 103. In some examples, the detection manager 120 determines when the movement detector 103 is in a learning time period and the threshold calculator 116 is calculating thresholds and/or when the movement detector 103 is in a detection time period and received wireless signal data is being analyzed by the wireless signal analyzer 118. Further, the detection manager 120 may interact with the other components of the computing device 102 to trigger a movement event (e.g., an event indicating that the computing device 102 has moved, etc.), reset the state of the movement detector 103, and other functions. The operation of the detection manager 120 is described in greater detail below with respect to FIGS. 2 and 3, and elsewhere herein.

Figure 2:
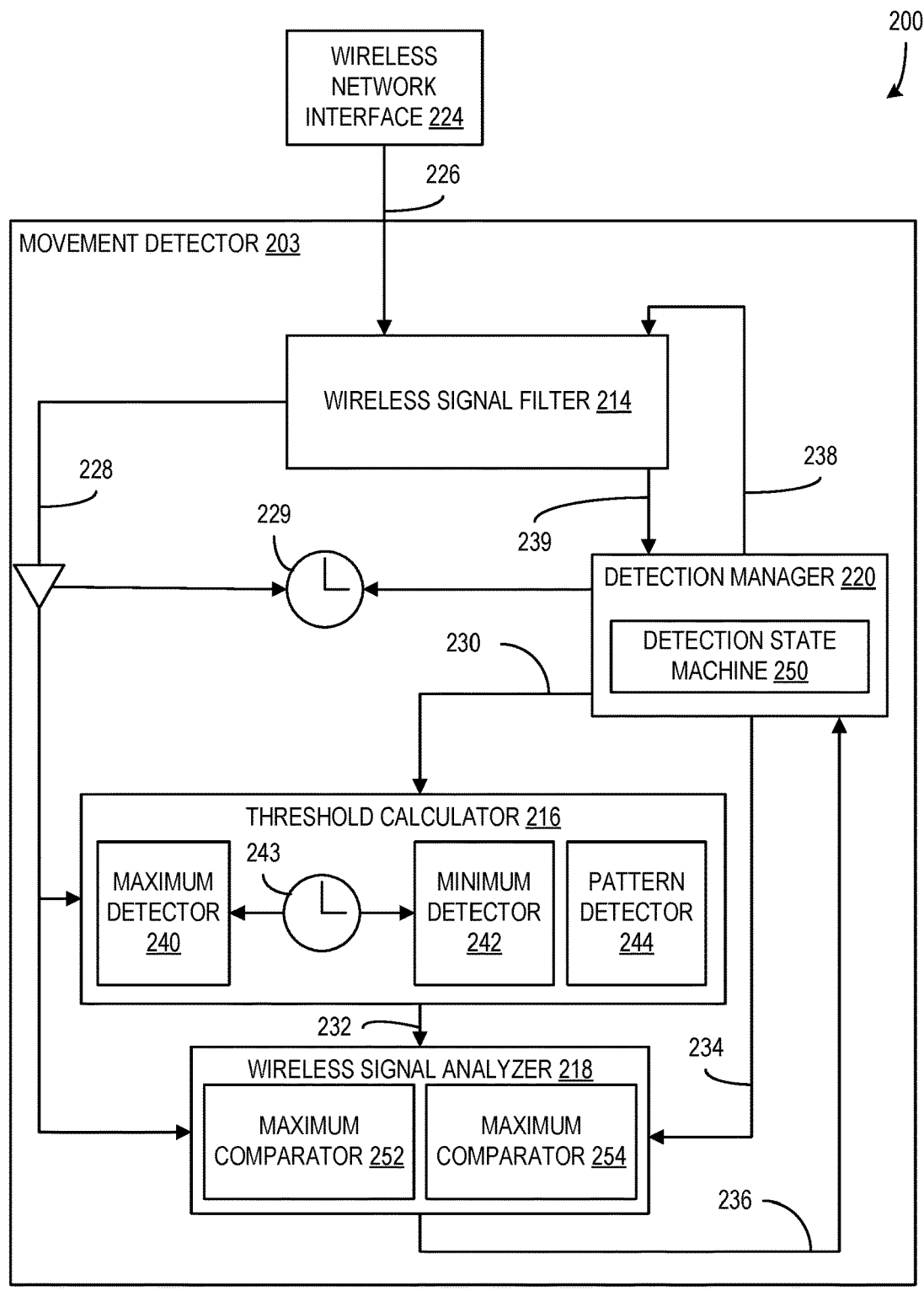
FIG. 2 is an exemplary block diagram illustrating a movement detector component and associated sub-components of a computing device according to an embodiment.

FIG. 2 is an exemplary block diagram 200 illustrating a movement detector component 203 and associated sub-components of a computing device according to an embodiment. Interactions between the sub-components of the movement detector 203 are illustrated as arrows as shown. It should be understood that the illustrated interactions are exemplary and, in other examples, the movement detector 203 sub-components may interact in different ways without departing from the description.

The wireless network interface 224 provides wireless signal data stream 226 to the movement detector 203. In some examples, the wireless signal data stream 226 is a signal strength data stream 226 that includes a stream of sequential signal strength values received by the movement detector 203 over time. The signal strength values may be provided by the wireless network interface 224 at regular or periodic intervals (e.g., 10 sequential signal strength values per second, etc.) in the signal strength data stream 226. The signal strength values may be in the form of RSSI values, and/or in other measures of signal strength (e.g., decibel-milliwatts (dBm), etc.). The signal strength data stream may include signal strength data from one wireless access point (e.g., wireless access point 108, etc.) or a plurality of wireless access points (e.g., wireless access points 108, 110, 112, etc.). In some instances, the wireless signal data stream 226 may include signal strength data from multiple wireless access points based on a scan being performed of nearby networks. The wireless network interface 224 may change between multiple channels during the scan to collect data from each of the multiple wireless access points. Such a scan may be performed at defined intervals (e.g., every 30 seconds, every 5 minutes, etc.). The intervals for scanning may be longer than the intervals for collecting signal strength from a connected wireless access point due to the potential disruption resulting from changing wireless channels during the scan.

In other examples, the wireless signal data stream 226 may include signal parameter data other than signal strength values (e.g., signal quality, etc.) without departing from the description.

The signal strength data stream 226 is received by the wireless signal filter 214. The wireless signal filter 214 is configured to filter the signal strength data stream 226 down to a defined signal strength data stream portion. The filtering applied to the signal strength data stream 226 may limit the data stream to a defined frequency range, reduce or eliminate signal noise, control for radio frequency (RF) interference, etc. The wireless signal filter 214 may include analog filter components and/or digital filter components. In some examples, the wireless signal filter 214 is a configurable low-pass filter that attenuates portions of the signal strength data stream 226 that have a higher frequency than a frequency threshold defined based on the configuration of the low-pass filter. The wireless signal filter 214 is further configured to receive configuration messages and/or instructions from the detection manager 220 via control data 238 as described below.

The wireless signal filter 214 sends a filtered signal strength data stream 228 to the threshold calculator 216 and the wireless signal analyzer 218. The wireless signal filter 214 may selectively send the data stream 228 to either the threshold calculator 216 or the wireless signal analyzer 218 depending on whether the movement detector 203 is in a learning state or a detection state. Alternatively, the wireless signal filter 214 may transmit the data stream 228 to each of the threshold calculator 216 and the wireless signal analyzer 218 regardless of the state of the movement detector 203. Further, the data stream 228 and/or bandwidth data (e.g., effective noise bandwidth (ENB), etc.) of the data stream 228 may be provided to a steady state timer 229.

The steady state timer 229 is configured to determine a stabilizing time period for the detection manager 220 to wait between resetting the wireless signal filter 214 and initiating a learning time period at the threshold calculator 216. The filtered data stream 228 may require a stabilizing time period to become stable after the initial application of the wireless signal filter 214 to the wireless signal data stream 226. In some examples, a narrow wireless signal filter 214 may require a longer stabilizing time period to become stable than a broad wireless signal filter 214. The stabilizing time period of the steady state timer 229 may further be configured and/or adjusted by the detection manager. For instance, the stabilizing time period may be adjusted to be shorter if the signal data stream 226 has low levels of variance, while the stabilizing time period may instead be adjusted to be longer if the signal data stream 226 has higher levels of variance.

The threshold calculator 216 further receives control data 230 from the detection manager 220. The control data 230 may include instructions for activation and/or deactivation depending on the state of the movement detector (e.g., the threshold calculator 216 may be activated during a learning state and deactivated during a detection state, etc.). During a learning state, the threshold calculator 216 is configured to calculate at least one threshold of the signal strength data stream 228 based on the signal strength values of the signal strength data stream 228 received over a learning time period while the computing device is within a defined area of interest. In some examples, the threshold calculator 216 calculates a maximum signal strength threshold via the maximum detector 240 and a minimum signal strength threshold via the minimum detector 242.

The maximum and minimum detectors 240 and 242 are sub-components including hardware, firmware, and/or software configured to identify maximum and minimum values of the received signal strength data stream 228 respectively. In some examples, the maximum detector 240 records a signal strength value of the signal strength data stream 228 at the beginning of a learning time period, as defined by a learning timer 243, and compares the recorded signal strength value to each other received signal strength value over the learning time period. The learning timer 243 may include a default or initial learning time period, but the learning time period may be adjusted and/or adapted based on control data 230 from the detection manager 220 (e.g., the learning time period of the learning timer 243 may be increased or decreased based on changes in the bandwidth of the data stream 228, user responses or other feedback based on detected movement events, etc.). Each time the received signal strength value exceeds the recorded signal strength value, the maximum detector 240 overwrites the recorded signal strength value with the received signal strength value. When the learning time period ends, the recorded signal strength value of the maximum detector 240 is the maximum signal strength value. It should be understood that the minimum detector 242 may operate in a similar way to identify the minimum signal strength value. The threshold calculator 216, during learning time periods, calculates thresholds that are specific to the current, defined area of the computing device relative to a wireless access point, such that, for each defined area in which the threshold calculations are performed, the resulting thresholds are adapted for use in the associated defined area. In this manner, the disclosure provides adaptive thresholds for use by other components, as described herein.

In some examples, the signal strength threshold calculated by the threshold calculator 216 may include the maximum and minimum signal strength values by the maximum detector 240 and the minimum detector 242 respectively. Alternatively, the threshold calculator 216 may receive, in the control data 230 from the detection manager 220, offset values to be applied to the maximum and minimum signal strength values when calculating the signal strength threshold. The offset values represent a margin of error, tolerance, or variance. The offset values may include a single value that is added to the maximum signal strength value and subtracted from the minimum signal strength value (e.g., an offset value of 5 is added to the maximum signal strength value and subtracted from the minimum signal strength value, etc.). Alternatively, the offset values may include separate values for adjusting the maximum and minimum signal strength values (e.g., a first offset value of 5 is added to the maximum signal strength value and a second offset value of 3 is subtracted from the minimum signal strength value, etc.).

Alternatively, or additionally, the control data 230 may include other rules to be applied by the threshold calculator 216 in calculating the signal strength threshold. For instance, the control data 230 may include a minimum and/or signal strength threshold range that the calculated thresholds must include (e.g., a minimum threshold range is defined as 10 units and the detected maximum and minimum thresholds are 80 and 74, such that the calculated thresholds are expanded to 82 and 72 to meet the 10-unit minimum requirement, etc.).

In some examples, the threshold calculator 216 is configured to calculate a mean value, a median value, mode value, standard deviation, and/or other analytics of the signal strength data stream 228. The resulting signal strength threshold(s) and/or range may be calculated based on these calculated values. For instance, a median signal strength value may be calculated and then a signal strength range may be determined by adding an offset to the median value and subtracting an offset from the median value to form the thresholds of the signal strength range.

In further examples, the threshold calculator 216 includes a pattern detector 244 configured to detect signal strength patterns, or signal "fingerprints", from the signal strength data stream based on the signal strengths of a plurality of wireless access points, quantity of the plurality of wireless access points, types of wireless access points, and/or identifiers of the plurality of wireless access points. For instance, a signal strength pattern may include a set of three wireless access points in range with each wireless access point having signal strengths in a 60-80 RSSI range. Other patterns may include specific identifiers of wireless access points. A signal strength pattern that is detected during a learning time period may be used to calculate signal strength thresholds and/or ranges of associated wireless access points for use by the wireless signal analyzer 218 as described herein.

The threshold calculator 216 provides a signal strength range 232 to the wireless signal analyzer 218 based on the threshold(s) calculated during the learning time period. The wireless signal analyzer 218 further receives the signal strength data stream 228 from the wireless signal filter 214 as described above. The detection manager 220 may further transmit control data 234 to the wireless signal analyzer 218 to manage the operations thereof.

The wireless signal analyzer 218 is configured to operate during a detection time period, as determined by the detection manager 220, to compare the signal strength values of the signal strength data stream 228 to the signal strength range 232. In some examples, the wireless signal analyzer 218 identifies when the signal strength data stream 228 is outside of the signal strength range 232 and determines whether the signal strength data stream 228 being outside of the signal strength range 232 indicates that the computing device (e.g., computing device 102, etc.) has moved outside the defined area where it was located during a prior learning time period (e.g., a movement event, etc.). The signal strength data stream 228 crossing out of the signal strength range 232 once may be sufficient to trigger a movement event 236, which is transmitted to the detection manager 220 as illustrated. Alternatively, or additionally, the control data 234 from the detection manager 220 may include movement event rules that indicate requirements for triggering a movement event 236. For instance, the control data 234 may include a movement event interval that indicates an interval of time that the signal strength data stream 228 must be outside of the signal strength range 232 to trigger a movement event (e.g., if the signal strength data stream 228 crosses outside of the signal strength range 232 for greater than a movement event interval of 2 seconds, the wireless signal analyzer 218 triggers movement event 236, etc.).

In examples where the signal strength range 232 is based on a combination of a maximum threshold and a minimum threshold, the wireless signal analyzer 218 may include a maximum comparator 252 and a minimum comparator 254 that are configured to detect when received values of the signal strength data stream 228 exceed or cross the maximum threshold and the minimum threshold respectively. The maximum comparator 252 may compare each received value of the data stream 228 to the maximum threshold of the signal strength range 232 and identify received values that are greater than the maximum threshold. Further, the maximum comparator 252 may determine a quantity of sequential received values that are greater than the maximum threshold and/or a time period during which sequential received values are greater than the maximum threshold. When the determined results of the maximum comparator 252 satisfy the requirements for a movement event, the movement event 236 may be triggered. It should be understood that the minimum comparator 254 may be configured to operate in a substantially similar manner with respect to a minimum threshold, and that the results of either comparator satisfying the requirements for a movement event may trigger the movement event 236.

In some examples, the movement event 236 indicates likely movement of the computing device to the detection manager 220 as shown. The detection manager 220 receives the movement event 236 and may be configured to respond to the movement event 236 by changing the state of the movement detector 203 generally as described herein. The detection manager 220 manages the operations of the movement detector 203 using a detection state machine 250.

Figure 3:
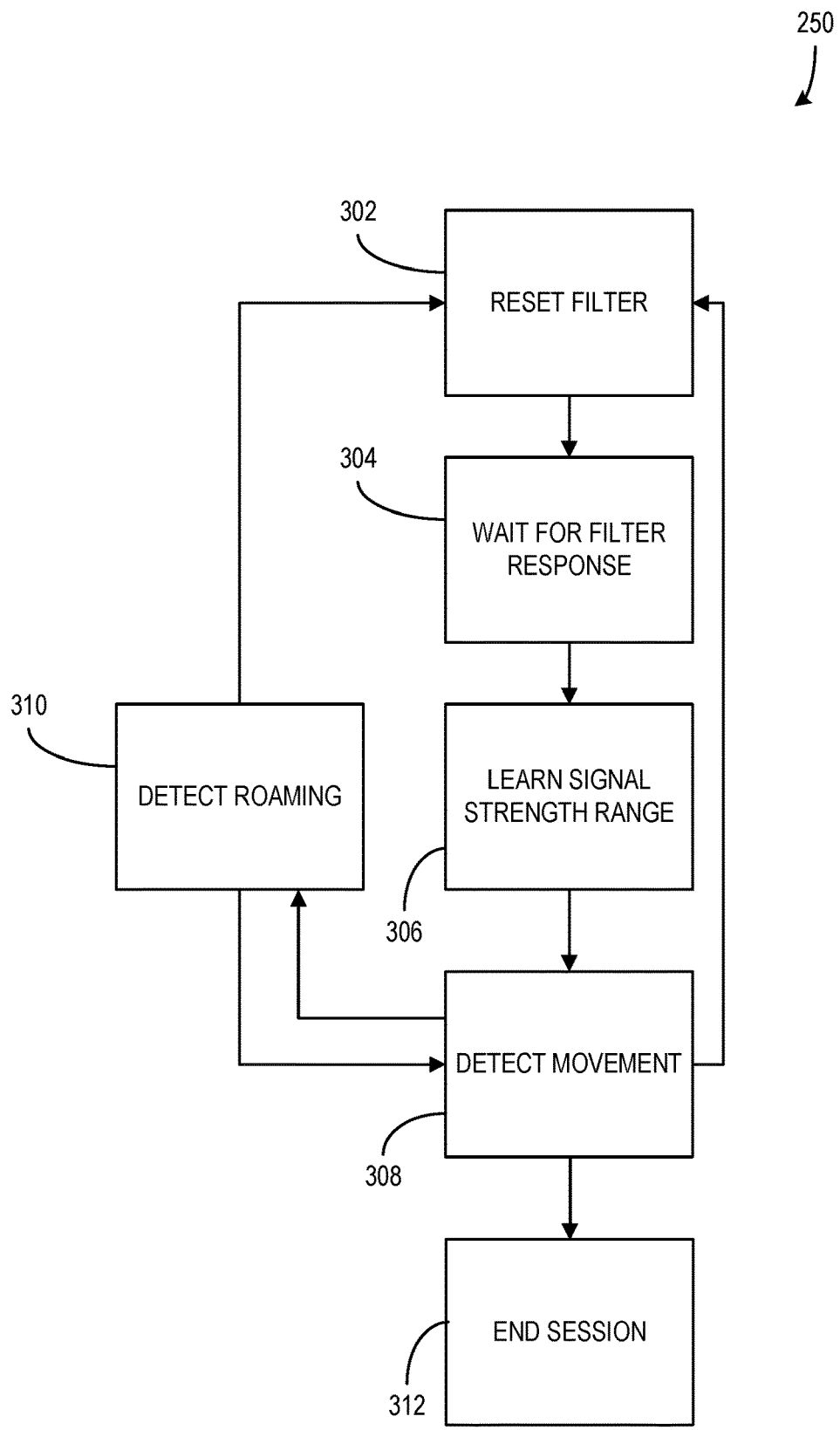
FIG. 3 is an exemplary flow chart illustrating states of a detection state machine configured for managing a movement detection process according to an embodiment.

FIG. 3 is an exemplary flow chart illustrating states of a detection state machine 250 configured for managing a movement detection process according to an embodiment. The detection state machine includes a reset filter state 302, a wait for filter response state 304, a learn signal strength range state 306, a detect movement state 308, a detect roaming state 310, and an end session state 312. In the reset filter state 302, the detection state machine 250 may cause the detection manager 220 to send a "reset" instruction to the wireless signal filter 214 via control data 238.

The state machine 250 transitions to the wait for filter response state 304 until a response 239 is received from the wireless signal filter 214 or a defined time interval expires (e.g., a stabilizing time period as described above with respect to the steady state timer 229, etc.). The response 239 may indicate that the filter 214 was successfully reset or that the reset operation failed. Upon receipt of a "success" response 239, the state machine 250 transitions to the learn signal strength range state 306. Alternatively, if a "failure" response 239 is received, the state machine 250 may be configured to transition back to the reset filter state 302. In some examples, the response is determined by the detection manager 220 based on detecting a stable data stream 228 and/or the passage of a stabilizing time period associated with the steady state timer 229.

In the learn signal strength range state 306, the detection manager 220 sends control data 230 and 234 to activate the threshold calculator 216 and deactivate the wireless signal analyzer 218 respectively. The learn signal strength range state 306 may be configured to last for a defined learning time period (e.g., 6 seconds, etc.). The detection manager 220 may further send control data 230 indicating offset values and/or rules for use by the threshold calculator 216 in calculating a signal strength range 232 as described above. Once the defined learning time period expires, the detection state machine 250 transitions to the detect movement state 308.

In the detect movement state 308, the detection manager 220 sends control data 230 and 234 to deactivate the threshold calculator 216 and activate the wireless signal analyzer 218 respectively. It should be understood that, when the threshold calculator 216 is deactivated, it does not calculate thresholds and/or ranges based on the signal strength data stream 228 but the most recently calculated thresholds or range 232 are available for use by the wireless signal analyzer 218. The detection manager 220 may further provide control data 234 to the wireless signal analyzer 218 that includes a movement detection interval and/or other rules for detecting and triggering a movement event 236 by the wireless signal analyzer 218 as described above. The detect movement state 308 may be configured to last until a movement event 236 is received from the wireless signal analyzer 218 and/or another event (e.g., a roaming event, etc.) interrupts the detect movement state 308. When a movement event 236 is received by the detection manager 220, the state machine 250 may transition back to the reset filter state 302, or to the end session state 312. A detection time period associated with the detect movement state 308 may be indeterminate as it ends when a movement event is triggered. Alternatively, the detect movement state 308 may include a defined detection time period interval that, upon expiration, causes the state machine 250 to transition to the reset filter state 302.

In some examples, the state machine 250 transitions to a secondary detect roaming state 310 after the learn signal strength range state 306 or from the detect movement state 308. The detect roaming state 310 causes the detection manager 220 to detect and respond to roaming events. A roaming event may be received by the movement detector application 203 from another application of the associated computing device (e.g., computing device 102, etc.). For instance, a connection manager application executing on the computing device may be configured to monitor available wireless access points and switch between connections to the available wireless access points based on signal strength, access point preference settings, or the like. The switch between connections to access points may trigger a roaming event as the computing device "roams" between access points. The roaming event may be shared with other applications of the computing device, including the movement detector 203. The detect roaming state 310 causes the detection manager 220 to transition to the reset filter state 302 upon detecting a roaming event. The detect roaming state 310 may also include a defined interval after which detection time period ends and the state machine 250 is configured to transition to the reset filter state 302.

Alternatively, or additionally, roaming events may be triggered by the movement detector application 203 based on, for instance, analysis of a calculated wireless signal pattern of the pattern detector 244.

In some examples, detection of a roaming event during the detect roaming state 310 may cause the detection manager 220 to transition to the detect movement state 308, such that the roaming event may be considered to indicate that a movement event has occurred. Roaming events may also be used as supplementary indicators for detecting movement based on signal strength data. For example, after a roaming event, the signal strength range may be tightened by a defined factor and/or the signal strength range may be adjusted based on a current state of the received data stream when the roaming event is detected.

Returning to FIG. 2, in some examples, the control data 238 from the detection manager 220 to the wireless signal filter 214 includes configuration data associated with the wireless signal filter 214. For instance, the control data 238 may include configuration data that causes the wireless signal filter 214 to adjust the range of the filter(s) applied to the received signal strength data stream 226. When the filter 214 is reset, the configuration data may be applied, causing the signal strength data stream 226 to be filtered based on the adjusted filter for the next learning time period and/or detection time period. After the successful application of the configuration data by the wireless signal filter 214, the response 239 is sent from the wireless signal filter 214 to the detection manager 220 as described above.

In some examples, after the wireless signal analyzer 218 detects a movement event, the movement detector 203 is configured to notify a user of the computing device (e.g., via a user interface). Further, the user may be prompted to provide a confirmation response that the computing device has moved or a denial response indicating that the detected movement event is in error. If the user confirms that the movement event is accurate, the movement detector 203 may cause other operations to be performed by the computing device. Within the movement detector 203, the detection state machine 250 may transition to a filter reset state (e.g., filter reset state 302, etc.), causing the wireless signal filter 214 to be reset. Alternatively, if the user denies that the movement event is accurate, the detection state machine 250 may return to a detect movement state (e.g., detect movement state 308, etc.) as described above.

The movement detector 203 may cause a movement event to be exposed and/or shared with other applications of the associated computing device. For instance, the movement detector 203 may expose application programing interfaces (APIs) for use by other applications and/or it may be configured to make use of the APIs of other applications. It should be understood that other applications may be configured to handle received movement events by performing operations as would be understood by a person of ordinary skill in the art. For instance, applications that maintain network connections via a wireless access point (e.g., a video streaming application, a remote media projection application (e.g., MIRACAST, etc.), a virtual reality application, an online game application, etc.) may be configured to disconnect, terminate, end, or otherwise disable sessions associated with maintained network connections that make use of a wireless access point away from which the computing device is moving. An example API is provided below.

DWORD
StartMovementDetector( );
DWORD
StopMovementDetector( );

Applications may make use of the example StartMovementDetector API above to begin listening for movement events that are triggered by the movement detector 203 (e.g., a component of the wireless local area network (WLAN) service of the computing device, etc.). Further, applications may use the StopMovementDetector API to stop listening for movement events. While listening, the applications may handle received movement events in any manner that would be understood by a person of ordinary skill in the art without departing from the description herein. For instance, a media projection application (e.g., MIRACAST, etc.) may begin listening for movement events based on the above API when a projection session begins and stop listening when the projection session ends. During the projection session, received movement events may be handled by prompting a user of the detected movement, ending the projection session, and/or resetting the movement detector components and continuing the projection session as described herein.

In some examples, the notification and/or prompt to the user based on a movement event is provided to the user via a user interface (e.g., user interface 122, etc.). For instance, the prompt may appear on a display of the computing device, asking the user to confirm the movement of the computing device. The user may be enabled to interact with the prompt by touching a touch screen, activating a button on the prompt with a mouse, or activating a key on a keyboard, etc. Additionally, or alternatively, the notification or prompt may include an audio notification (e.g., an alarm or bell sounding, etc.) and/or a physical notification (e.g., the computing device vibrating, etc.). Further methods of notification may include, for instance, sending a notification to a user by electronic mail (email), SMS, or other method of messaging.

The user responses to movement events may be recorded by the movement detector 203 and used to update and/or adjust the operations of the sub-components of the movement detector 203, adapting the operation of the movement detector 203 to provide more accurate movement event identification. The movement detector 203 may include a machine learning engine or the like that is configured to adjust at least one parameter of the operations of the movement detector 203 when provided with data associated with a triggered movement event and user feedback from the triggered movement event. For instance, a denial response from a user based on a triggered movement event may indicate that the calculated signal strength range is too small, or "tight". The machine learning engine may be configured to increase offset values used by the threshold calculator 216 to widen calculated signal strength ranges (e.g., increasing an offset value used by the threshold calculator 216 from 3 to 6 may cause signal strength ranges calculated in the future to be 6 units wider (an increase of 3 units on both thresholds of the range), reducing the number of false movement events, etc.). Alternatively, or additionally, the machine learning engine may be configured to adjust the learning time period length, a movement event interval, filter configuration parameters of the wireless signal filter 114, other rules used to calculate thresholds and/or analyze the signal strength data stream to identify movement events, and/or other signal strength range determination factors.

In some examples, a machine learning module of the movement detector 203 comprises a trained regressor such as a random decision forest, directed acyclic graph, support vector machine, neural network, or other trained regressor. The trained regressor may be trained using the feedback data described above. Examples of trained regressors include a convolutional neural network and a random decision forest. It should further be understood that the machine learning module, in some examples, may operate according machine learning principles and/or techniques known in the art without departing from the systems and/or methods described herein.

In an example, the machine learning module may make use of training data pairs when applying machine learning techniques and/or algorithms. Millions of training data pairs (or more) may be stored in a machine learning data structure. In some examples, a training data pair includes a feedback data value paired with a rule adjustment value and/or a threshold adjustment value associated with calculating thresholds. The pairing of the two values demonstrates a relationship between the feedback data value and the adjustment values that may be used by the machine learning module to determine future rule adjustments and/or threshold adjustments according to machine learning techniques and/or algorithms. In some examples, the machine learning module may be located on another computing device with which the movement detector 203 is in communication, such as a server associated with the movement detector 203 application or other entity.

In further examples, the calculated thresholds and/or adjustments made by a machine learning module may be stored at the movement detector 203 and/or in another location (e.g., on an associated server, etc.) for use on other computing devices. For instance, a calculated signal strength range associated with a wireless access point may be uploaded to an associated server. When another computing device that includes a movement detector application comes into range of and/or connects to that particular wireless access point, the movement detector may be configured to access the server and download the calculated signal strength range for use in detecting movement of the computing device. The downloaded signal strength range may be used as a default range and/or initial range, and the movement detector may adjust or otherwise change the signal strength range based on operation of a threshold calculator during a learning time period as described herein. Additionally, when a machine learning component adjusts offset values, rules, or the like that are used by the movement detector as described herein, the adjustments may be stored on the server as well. Stored adjustments may also be used by other computing devices with movement detectors as initial parameters for movement detection operations.

Figure 4:
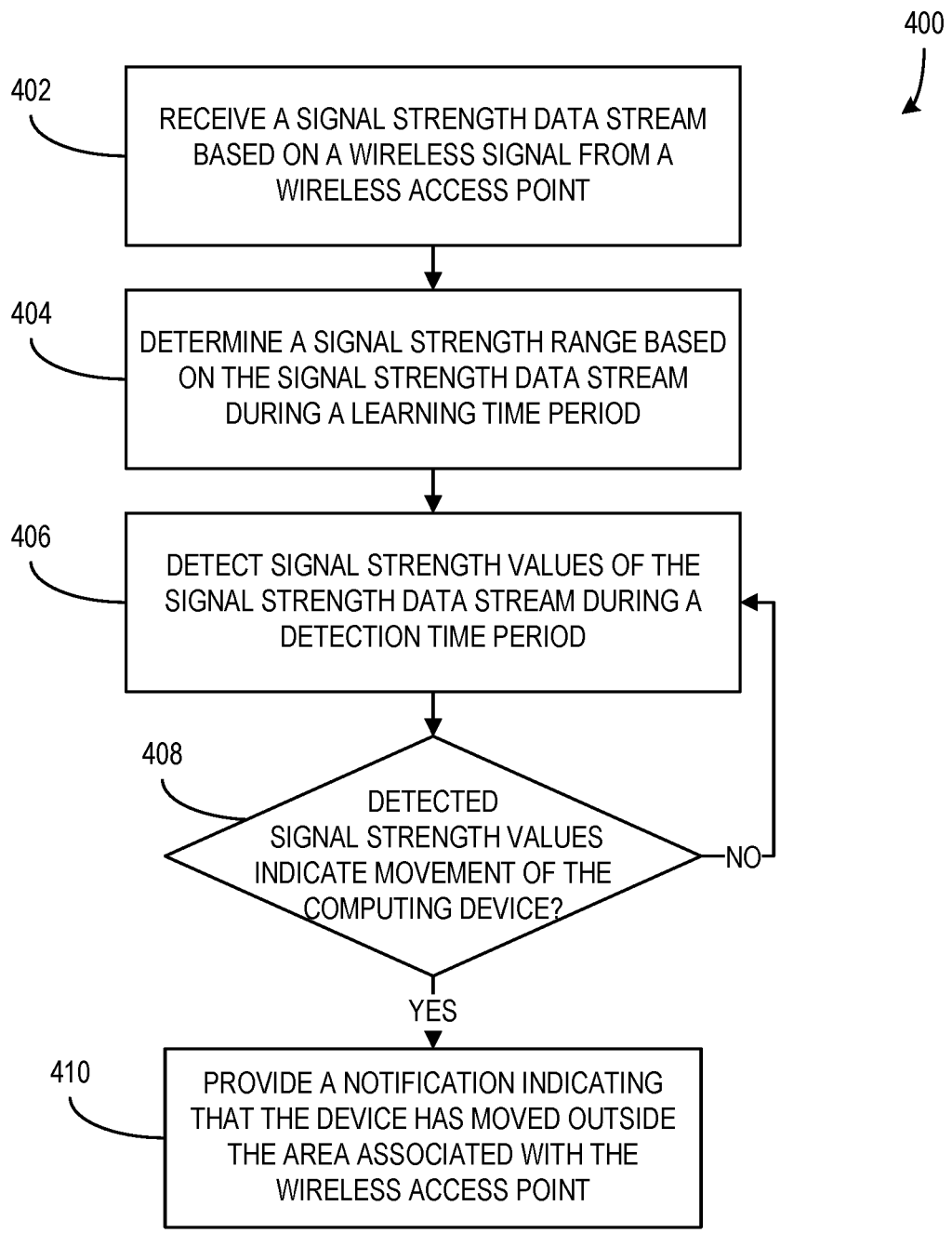
FIG. 4 is an exemplary flow chart illustrating detecting movement of a computing device and responding to the movement detection according to an embodiment.

FIG. 4 is an exemplary flow chart 400 illustrating detecting movement of a computing device and responding to the movement detection according to an embodiment. In some examples, the system 100 of FIG. 1 and/or the movement detector 203 of FIG. 2 are configured to implement the process described by flow chart 400. At 402, a signal strength data stream based on a wireless signal from a wireless access point is received. The received signal strength data stream may be based on the wireless signals generally emitted from the wireless access point and a connection the wireless access point by a computing device or applications thereon is not necessary (e.g., the computing device is configured to detect wireless signal strength data without connecting to the wireless access point, etc.).

At 404, a signal strength range based on the signal strength data stream is determined during a learning time period during which the device is within a defined area. The area may be defined based on user preference (e.g., at the front of a classroom or lecture hall), physical boundaries (e.g., walls), etc. The signal strength range may be based on one or more calculated thresholds as described herein. Further, the signal strength range may be based on the application of one or more offset values and/or other rules to calculate thresholds (e.g., offset values of 5 units may be added and/or subtracted from calculated thresholds to "widen" or "narrow" the resulting signal strength range, etc.).

At 406, signal strength values of the signal strength data stream are detected during a detection time period. This may include detecting signal strength values inside of, or within the bounds of, the signal strength range defined at 404 (e.g., less than an upper value and greater than a lower value) and/or signal strength value outside of the signal strength range defined at 404 (e.g., less than a lower value or greater than an upper value). In practice, there may be a tolerance (e.g., time-based) at the boundaries of the signal strength range before concluding that the signal strength values are either 'inside' or 'outside' of the signal strength range. The detection of signal strength values outside of the range may further include detecting the outside signal strength values over a detection interval (e.g., a series of signal strength values outside the signal strength range over the course of a 3 second detection interval may trigger a movement event, etc.).

If, at 408, the detected signal strength values indicate movement of the computing device (e.g., the signal strength values are outside the signal strength range for a defined detection interval, etc.), a notification is provided indicating that the device has moved outside a defined area associated with the wireless access point at 410. Alternatively, if the detected signal strength values do not indicate movement of the computing device at 408 (e.g., the detected signal strength values are outside the signal strength range for less than a defined detection interval, etc.), the movement detector component continues to detect signal strength values at 406 as illustrated.

The notification at 410 may be provided to a user of the computing device and/or to other applications and/or components of the computing device. For instance, a notification may be provided to a user in the form of a dialog box that appears on a screen of the computing device for viewing by the user. Alternatively, or additionally, the notification may be provided to other applications and/or components of the computing device in the form of an interrupt event or the like that is actively provided to the other applications and/or passively exposed to the other applications as described herein. In some examples, the provided notification may cause responses from one or more other applications or components of the computing device as described herein (e.g., an application disconnecting or otherwise canceling interaction over a connection associated with the wireless access point, etc.).

Figure 5:
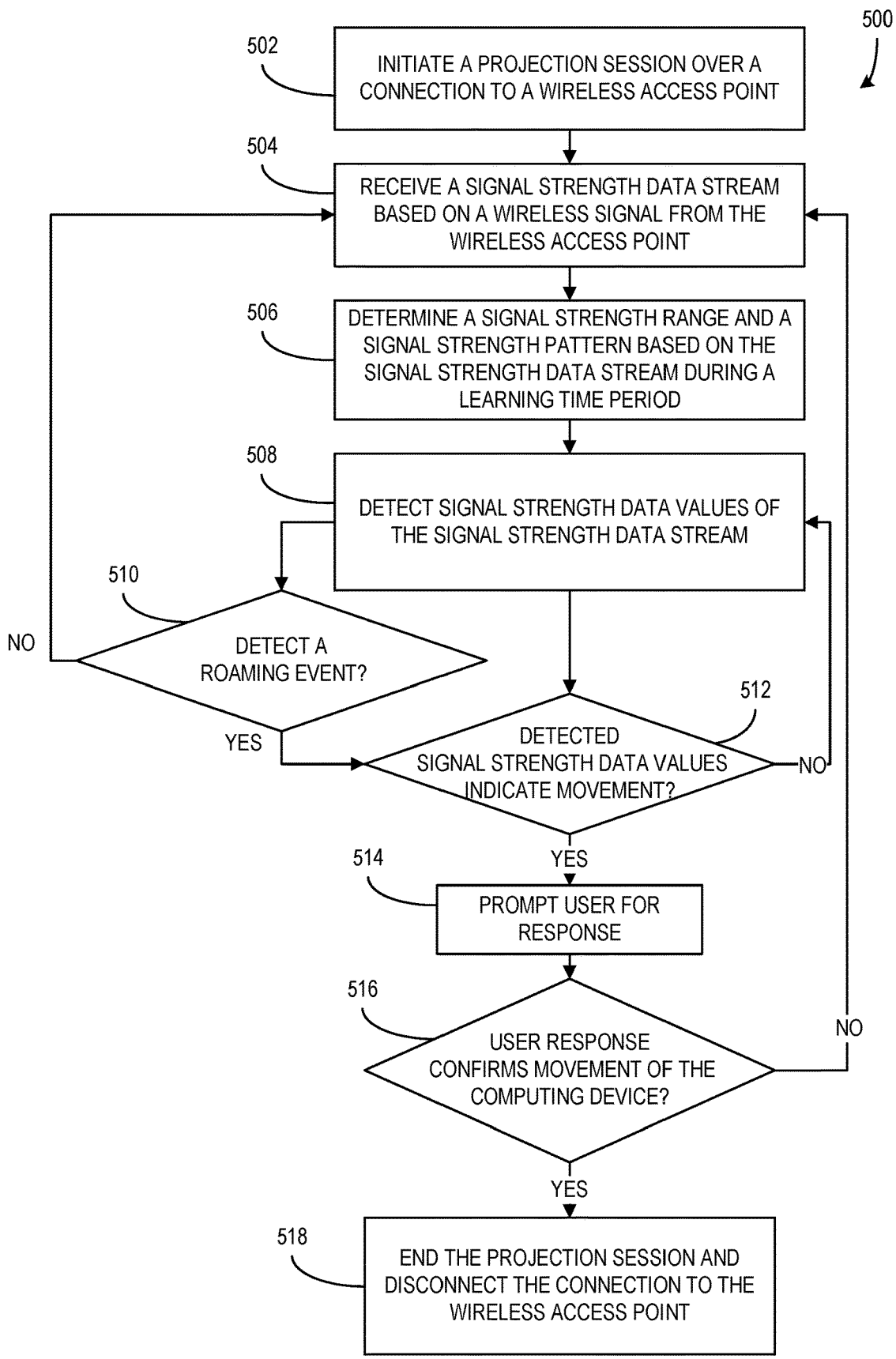
FIG. 5 is an exemplary flow chart illustrating detecting movement of a computing device and responding to the movement detection during a projection session according to an embodiment.

The operations illustrated and described with reference to FIG. 4 and FIG. 5 are operable without using conventional location-determination solutions, such as a global positioning system (GPS), and/or without relying on other computing devices, such as a location determination provided by a computing device in a cloud. In this manner, the operations described herein operate effectively even when the computing device lacks a connection to the Internet. For example, wireless access points may be available, but do not provide a connection to the Internet (e.g., when the wireless access points act as portals and the computing device lacks access credentials to connect through those portals to the Internet).

FIG. 5 is an exemplary flow chart 500 illustrating detecting movement of a computing device and responding to the movement detection during a projection session according to an embodiment. In some examples, the system 100 of FIG. 1 and/or the movement detector 203 of FIG. 2 are configured to implement the process described by flow chart 500. At 502, a projection session is initiated over a connection to a wireless access point. The projection session may be initiated by a media projection application (e.g., MIRACAST, etc.). The media projection application may be configured to interact with a movement detector application (e.g., movement detector 203, etc.) or a movement detector application may be included as a sub-component of the media projection application, etc.

At 504-508, a signal strength data stream is received, a signal strength range is determined during a learning time period, and signal strength data values are detected during a detection time period in a substantially similar manner as described above with respect to 402-406 of FIG. 4. Further, at 506, a signal strength pattern is determined based on signal strength data received from a plurality of wireless access points, including the connected wireless access point. The signal strength pattern may be based on the quantity of detected wireless access points and/or the signal strength values of the plurality of wireless access points. Changes in the signal strength pattern may cause roaming events to be triggered as described above (e.g., roaming events may also be triggered based on the device automatically switching between wireless access points, etc.). The system may be configured to detect both roaming events and movement events in parallel, such that, during the detection of signal strength data values at 508, the process may proceed to either 510 or 512 depending on the type of event that is detected.

If a roaming event is detected based on the signal strength pattern at 510, the process proceeds to 512 to determine whether the detected roaming event indicates that movement has occurred. Further, a roaming event may cause the learning time period and/or the signal strength range to be adjusted as described herein. Alternatively, if a roaming event is not detected at 510, the process may return to receiving a signal strength data stream at 504, causing the signal strength range and signal strength pattern to be determined again at 506.

If, at 512, the detected signal strength values indicate movement as described above (e.g., a movement event is detected, etc.), the user of the computing device is prompted for a response at 514. The prompt may request that the user confirm or deny that the computing device is has moved outside of an area associated with the wireless access point (e.g., an office, conference room, or other room where the user is presenting the projection session, etc.). For instance, the computing device may display a dialog box on a touchscreen to the user, presenting the user with the option of confirming or denying the movement of the computing device by activating buttons associated with the dialog box.

Alternatively, if the detected signal strength values do not indicate movement at 512, the process returns to detecting signal strength values at 508.

If, at 516, the user response confirms that the computing device is moving or has moved from the area associated with the wireless access point, the movement detector application of the computing device causes the projection session to end at 518. Further, connections to the wireless access point may be disconnected or otherwise ended. The movement detector may expose the detected movement event for use by a media projection application, which may be configured to end projection sessions upon receiving movement events. Alternatively, if the movement detector application is part of the media projection application, the movement detector application may directly cause the media projection application to end the session and/or disconnect from the connection using the wireless access point.

Alternatively, if the user response does not confirm the movement of the computing device at 516, the process may return to receiving a signal strength data stream at 504. The learning time period to determine a signal strength range may be performed again with adjusted filtering, offset values, or other rules based on the negative user feedback as described herein.

ADDITIONAL EXAMPLE SCENARIOS

Aspects of the disclosure enable various additional scenarios, such as next described.

In an example, a user is using a media projection application to display a presentation from the user's mobile device to a Wi-Fi enabled projector in a conference room. The user's mobile device and the projector are connected to a wireless access point that is positioned in the corner of the conference room. The user initiates a projection session using the mobile device, located near the corner of the conference room, forming a connection with the projector via the wireless access point and causing a presentation on the mobile device to be projected on a screen in the conference room by the projector. In this example, the 'defined area' is generally the corner of the conference room.

The mobile device also includes a movement detector application as described herein. Upon initiating the projection session, the movement detector begins receiving signal strength data stream from the wireless access point and enters a learning state while the mobile device is in the defined area of the conference room. The movement detector collects the signal strength data over the course of a learning time period and calculates a signal strength range associated with the wireless access point and the current location of the mobile device with respect to the wireless access point. After the learning time period expires, the movement detector enters a detection state and begins to compare the incoming signal strength data values to the calculated signal strength range as they are received. In this example, during a first portion of the user's presentation, the user may stand generally still and the signal strength data values generally remain within the signal strength range. Thus, no movement is detected by the movement detector.

Later in the presentation, the user moves to the other side of the conference room; that is, outside the defined area from the learning time period. The signal strength values received by the movement detector change based on the user's new location within the conference room, and now the values are outside the signal strength range. When the signal strength values remain outside the signal strength range for a defined detection interval, the movement detector triggers a movement event. Initially, the user is provided with a notification that movement of the mobile device was detected. The notification prompts the user to confirm or deny the movement of the computing device with respect to the wireless access point. Further, the notification instructs the user that the presentation session will be ended and the connection to the projector via the wireless access point will be disconnected if the user confirm movement away from the wireless access point (or does not deny the movement away from the wireless access point). The user may respond that the computing device has not moved away from the wireless access point because the user has only moved across the front of the conference room but wishes to continue the project session. In response to this denial response from the user, the movement detector resets and reenters the learning state, thereby calculating an adapted signal strength range that includes the old signal strength range as well as a new range associated with newly-expanded defined area. The user continues the presentation, moving across the conference room several more times. Based on the newly calculated signal strength range, the movement detector does not trigger another movement event during the remainder of the presentation.

After the presentation ends, the user forgets to end the projection session and instead, proceeds out of the defined area (e.g., out of the conference room). After traveling a short distance out of the conference room, the movement detector, once again in a detection state, triggers a movement event based on signal strength data from the wireless access point that remains in the conference room. The user receives a notification from the movement detector again, and this time, the user confirms that the mobile device is moving away from the area of the wireless access point (or does not deny that the movement event is accurate). The movement detector causes the media projection application to end the projection session and to disconnect from the projector device. Separately, a connection manager on the mobile device may disconnect from the wireless access point at some point (e.g., roam to another wireless access point). When roaming without detecting movement, the disconnect/ connect to the wireless access points is seamless, and the connection to the projector device continues.

In another example, the user is giving another presentation in a similar setup as the above example. During the learning state, the movement detector calculates a wireless access point signal pattern associated with a plurality of wireless access points that are in range of the mobile device while the mobile device is within a defined area. As the presentation proceeds, a nearby wireless access point comes online, changing the wireless access point signal pattern, or "fingerprint", of the location of the mobile device. The movement detector detects the change in the pattern in the detection state and triggers a roaming event (in another example, a roaming event may be triggered by, for instance, the mobile device actually switching connections to the newly available wireless access point). The movement detector triggers a movement event based on the roaming event, prompting the user to confirm or deny that the mobile device has moved. The user denies that the mobile device has moved and the movement detector resets and transitions back to a learning state, recalculating a signal strength range and a wireless access point signal pattern as described herein, but now reflective of the newly-added wireless access point.

In another example, in the training state, RSSI values are collected for some number of samples (30-100) and a mean and standard deviation is calculated. These values are used to establish a baseline to account for fluctuations in the RSSI value. After enough samples are gathered to determine the baseline, a moving average of samples (15-30 samples) is collected. If the moving average changes beyond 3 standard deviations of the mean, then movement is detected. The standard deviations may be rounded up to a minimum value to prevent the movement detection from being overly sensitive.

Exemplary Operating Environment

Figure 6:
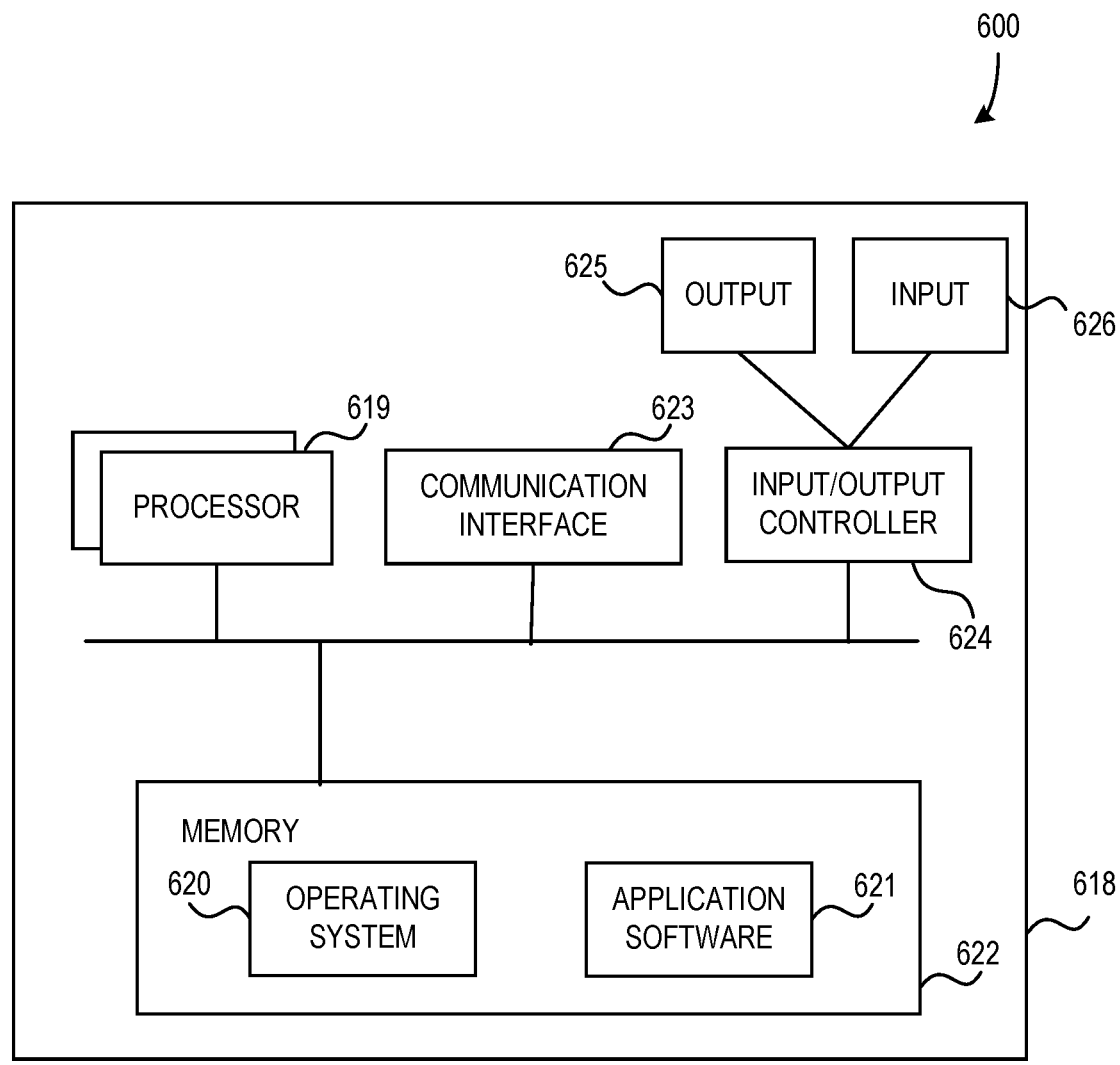
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Platform software comprising an operating system 620 or any other suitable platform software may be provided on the apparatus 618 to enable application software 621 to be executed on the device. According to an embodiment, detecting movement of a computing device based on analysis of wireless signal strength data as described herein may be accomplished by software.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for detecting movement of a computing device comprising:
at least one processor of the computing device;
at least one wireless network interface of the computing device; and
at least one memory comprising computer program code, the at least one memory and the computer program code configured to, with the at least one processor, cause the at least one processor to:
receive, via the wireless network interface, a signal strength data stream based on at least one wireless signal from a connected wireless access point;
determine a signal strength range based on the signal strength data stream during a learning time period, the signal strength range indicating the computing device is within a defined area associated with the connected wireless access point;
detect signal strength values of the signal strength data stream during a detection time period; and
based on detecting signal strength values inside of the signal strength range, maintain a connection of at least one application with the connected wireless access point or, based on detecting signal strength values outside of the signal strength range, disconnect a connection of at least one application with the connected wireless access point.
wherein, based on detecting signal strength values outside of the signal strength range, a notification is provided for display on a user interface of the computing device, the notification including a prompt requesting that a user confirm or deny that the computing device has moved outside the area associated with the connected wireless access point; and
wherein disconnecting the connection of at least one application is further based on a feedback response to the provided notification.
wherein the at least one application includes a media projection application configured for projecting interface data of the computing device to a visual projection device using a connection with the connected wireless access point; and disconnecting a connection of at least one application includes disconnecting the connection of the projection application to the connected wireless access point, disabling a current projection session of the projection application.
wherein determining the signal strength range includes:
identifying a maximum signal strength value of the signal strength data stream during the learning time period;
identifying a minimum signal strength value of the signal strength data stream during the learning time period;
applying a maximum signal strength threshold offset to the maximum signal strength value to form a maximum signal strength threshold of the signal strength range; and
applying a minimum signal strength threshold offset to the minimum signal strength value to form a minimum signal strength threshold of the signal strength range;
wherein the maximum signal strength threshold and the minimum signal strength threshold form boundaries of the signal strength range.
wherein determining the signal strength range includes accessing, by the at least one processor, stored signal strength range data associated with past usage of the connected wireless access point and determining the signal strength range based on the stored signal strength range data.
wherein the received signal strength data stream includes signal strength data from a plurality of wireless access points;
wherein the at least one memory and the computer program code are configured to, with the at least one processor, further cause the at least one processor to:
identify a wireless access point signal pattern based on the signal strength data from the plurality of wireless access points during the learning time period; compare the received signal strength data from the plurality of wireless access points to the identified wireless access point signal pattern during the detection time period; and
based on the comparison of the signal strength data to the wireless access point signal pattern indicating that roaming event has occurred, reset the signal strength range such that a learning time period is initiated and the signal strength range is redetermined.
A computerized method for detecting movement of a computing device, the method comprising:
receiving, by a processor of the computing device, a signal strength data stream based on at least one wireless signal from a connected wireless access point;
determining, by the processor, a signal strength range based on the signal strength data stream during a learning time period, the signal strength range indicating the computing device is within a defined area associated with the connected wireless access point;
detecting, by the processor, signal strength values of the signal strength data stream during a detection time period; and based on detecting signal strength values inside of the signal strength range, maintaining a connection of at least one application with the connected wireless access point or, based on detecting signal strength values outside of the signal strength range, disconnecting a connection of at least one application with the connected wireless access point.

wherein, based on detecting signal strength values outside of the signal strength range, a notification is provided for display on a user interface of the computing device, the notification including a prompt requesting that a user confirm or deny that the computing device has moved outside the area associated with the connected wireless access point; and wherein disconnecting the connection of at least one application is further based on a feedback response to the provided notification.

wherein the at least one application includes a media projection application configured for projecting interface data of the computing device to a visual projection device using a connection with the connected wireless access point; and disconnecting a connection of at least one application includes disconnecting the connection of the projection application to the connected wireless access point, disabling a current projection session of the projection application.

further comprising adjusting, by the processor, at least one signal strength range determination factor based on the received feedback response using machine learning, wherein determining the signal strength range during the learning time period is based on the at least one signal strength range determination factor.

wherein the at least one signal strength range determination factor includes at least one of a maximum signal strength threshold offset value, a minimum signal strength threshold offset value, and a learning time period offset value.

wherein determining the signal strength range includes:
identifying, by the processor, a maximum signal strength value of the signal strength data stream during the learning time period;
identifying, by the processor, a minimum signal strength value of the signal strength data stream during the learning time period;
applying, by the processor, a maximum signal strength threshold offset to the maximum signal strength value to form a maximum signal strength threshold of the signal strength range; and
applying, by the processor, a minimum signal strength threshold offset to the minimum signal strength value to form a minimum signal strength threshold of the signal strength range;
wherein the maximum signal strength threshold and the minimum signal strength threshold form boundaries of the signal strength range.

wherein determining the signal strength range includes accessing, by the processor, stored signal strength range data associated with past usage of the connected wireless access point and determining the signal strength range based on the stored signal strength range data.

wherein the received signal strength data stream includes signal strength data from a plurality of wireless access points;
wherein the method further comprises identifying, by the processor, a wireless access point signal pattern based on the signal strength data from the plurality of wireless access points during the learning time period;
comparing, by the processor, the received signal strength data from the plurality of wireless access points to the identified wireless access point signal pattern during the detection time period; and
based on the comparison of the signal strength data to the wireless access point signal pattern indicating that roaming event has occurred, resetting the signal strength range such that a learning time period is initiated and the signal strength range is redetermined.

wherein receiving the signal strength data stream includes receiving raw signal strength data and applying a low pass filter to received raw signal strength data to form the signal strength data stream.

wherein the learning time period is triggered by a roaming event of the computing device, wherein the roaming event indicates that the computing device has switched a connection from a first wireless access point to a second wireless access point.

One or more computer storage media having computer-executable instructions for detecting movement of a computing device that, upon execution by a processor, cause the processor to at least:
receive a signal strength data stream based on at least one wireless signal from a connected wireless access point;
determine signal strength range based on the signal strength data stream during a learning time period, the signal strength range indicating the computing device is within a defined area associated with the connected wireless access point;
detect signal strength values of the signal strength data stream during a detection time period; and
based on detecting signal strength values inside of the signal strength range, maintain a connection of at least one application with the connected wireless access point or, based on detecting signal strength values outside of the signal strength range, disconnect a connection of at least one application with the connected wireless access point.

wherein, based on detecting signal strength values outside of the signal strength range, a notification is provided for display on a user interface of the computing device, the notification including a prompt requesting that a user confirm or deny that the computing device has moved outside the area associated with the connected wireless access point; and wherein disconnecting the connection of at least one application is further based on a feedback response to the provided notification.

wherein the at least one application includes a media projection application configured for projecting interface data of the computing device to a visual projection device using a connection with the connected wireless access point; and disconnecting a connection of at least one application includes disconnecting the connection of the projection application to the connected wireless access point, disabling a current projection session of the projection application.

wherein determining the signal strength range includes accessing, by the processor, stored signal strength range data associated with past usage of the connected wireless access point and determining the signal strength range based on the stored signal strength range data.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving a signal strength data stream based on at least one wireless signal from a connected wireless access point, means for determining a signal strength range based on the signal strength data stream during a learning time period, the signal strength range indicating the computing device is within a defined area associated with the connected wireless access point, means detecting signal strength values of the signal strength data stream that are outside of the signal strength range during a detection time period, and providing a notification indicating that the device has moved outside the area associated with the connected wireless access point based on the detected signal strength values outside of the signal strength range. The illustrated one or more processors 619 together with the computer program code stored in memory 622 constitute exemplary processing means for filtering and analyzing wireless signal data and identifying movement of the computing device as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for detecting movement of a computing device using adaptive thresholds, the system comprising:
    at least one processor of the computing device;
    at least one wireless network interface of the computing device; and
    at least one memory comprising computer program code, the at least one memory and the computer program code configured to, with the at least one processor, cause the at least one processor to:
    receive, via the wireless network interface, a signal strength data stream based on at least one wireless signal from a connected wireless access point;
    detect an initiation of an application session of at least one application executing on the computing device that uses a connection with the connected wireless access point;
    based on the detected initiation of the application session, initiate a learning time period associated with the application session on the computing device;
    perform, during the learning time period:
        based on the connection with the connected wireless access point used by the application session, obtain an initial signal strength range associated with the connected wireless access point, and
        adjust the initial signal strength range based on signal strength values of the signal strength data stream during the learning time period, the adjusted signal strength range indicating the computing device is within a defined area associated with a location of the computing device upon the initiation of the application session using the connection with the connected wireless access point;
    based on completion of the learning time period, detect signal strength values of the signal strength data stream during a detection time period; and
    based on detecting signal strength values inside of the adjusted signal strength range during the detection time period, maintain the connection of the at least one application with the connected wireless access point or, based on detecting signal strength values outside of the adjusted signal strength range during the detection time period, disconnect the connection of the at least one application with the connected wireless access point.

2. The system of claim 1, wherein, based on detecting signal strength values outside of the adjusted signal strength range, a notification is provided for display on a user interface of the computing device, the notification including a prompt requesting that a user confirm or deny that the computing device has moved outside the area associated with the connected wireless access point; and wherein the at least one memory and the computer program code is configured to, with the at least one processor, further cause the at least one processor to:

based on receiving a user response to the prompt that confirms the computing device has moved outside the area associated with the connected wireless access point, disconnect the connection to the wireless access point used by the application session; and based on receiving a user response to the prompt that denies that the computing device has moved outside the area associated with the connected wireless access point, reinitiate the learning time period associated with the application session on the computing device.

3. The system of claim 2, wherein the at least one application includes a media projection application configured for projecting interface data of the computing device to a visual projection device in a room using a connection with the connected wireless access point and the defined area is an area within the room; and disconnecting the connection of the at least one application includes disconnecting the connection of the projection application to the connected wireless access point, thereby disabling a current projection session of the projection application.

4. The system of claim 1, wherein determining the signal strength range includes:

identifying a maximum signal strength value of the signal strength data stream during the learning time period;

identifying a minimum signal strength value of the signal strength data stream during the learning time period;

applying a maximum signal strength threshold offset to the maximum signal strength value to form a maximum signal strength threshold of the signal strength range; and applying a minimum signal strength threshold offset to the minimum signal strength value to form a minimum signal strength threshold of the signal strength range;

wherein the maximum signal strength threshold and the minimum signal strength threshold form boundaries of the signal strength range.

5. The system of claim 1, wherein obtaining the initial signal strength range includes accessing, by the at least one processor, the initial signal strength range stored on a server, wherein the accessed initial signal strength range is associated with past usage of the connected wireless access point by at least one different computing device.

6. The system of claim 1, wherein the received signal strength data stream includes signal strength data from a plurality of wireless access points;

wherein the at least one memory and the computer program code are configured to, with the at least one processor, further cause the at least one processor to:

identify a wireless access point signal pattern based on the signal strength data from the plurality of wireless access points during the learning time period;

compare the received signal strength data from the plurality of wireless access points to the identified wireless access point signal pattern during the detection time period; and based on the comparison of the signal strength data to the wireless access point signal pattern indicating that roaming event has occurred, reset the signal strength range such that a learning time period is initiated and the signal strength range is redetermined.

7. A computerized method for detecting movement of a computing device using adaptive thresholds, the method comprising:

receiving, by a processor of the computing device, a signal strength data stream based on at least one wireless signal from a connected wireless access point;

detecting, by the processor, an initiation of an application session of at least one application executing on the computing device that uses a connection with the connected wireless access point;

based on the detected initiation of the application session, initiating, by the processor, a learning time period associated with the application session on the computing device:

performing, by the processor, during the learning time period:

based on the connection with the connected wireless access point used by the application session, obtaining an initial signal strength range associated with the connected wireless access point, and adjusting the initial signal strength range based on signal strength values of the signal strength data stream during the learning time period, the adjusted signal strength range indicating the computing device is within a defined area associated with a location of the computing device upon the initiation of the application session using a connection with the connected wireless access point;

based on completion of the learning time period, detecting, by the processor, signal strength values of the signal strength data stream during a detection time period; and based on detecting signal strength values inside of the adjusted signal strength range during the detection time period, maintaining the connection of the at least one application with the connected wireless access point or, based on detecting signal strength values outside of the adjusted signal strength range during the detection time period, disconnect the connection of the at least one application with the connected wireless access point.

8. The computerized method of claim 7, wherein, based on detecting signal strength values outside of the signal strength range, a notification is provided for display on a user interface of the computing device, the notification including a prompt requesting that a user confirm or deny that the computing device has moved outside the area associated with the connected wireless access point; and wherein the method further comprises:

based on receiving a user response to the prompt that confirms the computing device has moved outside the area associated with the connected wireless access point, disconnecting the connection to the wireless access point used by the application session; and based on receiving a user response to the prompt that denies that the computing device has moved outside the area associated with the connected wireless access point, reinitiating the learning time period associated with the application session on the computing device.

9. The computerized method of claim 8, wherein the at least one application includes a media projection application configured for projecting interface data of the computing device to a visual projection device in a room using a connection with the connected wireless access point and the defined area is an area within the room; and disconnecting the connection of the at least one application includes disconnecting the connection of the projection application to the connected wireless access point, thereby disabling a current projection session of the projection application.

10. The computerized method of claim 8, further comprising adjusting, by the processor, at least one signal strength range determination factor based on the received feedback response using machine learning, wherein determining the signal strength range during the learning time period is based on the at least one signal strength range determination factor.

11. The computerized method of claim 10, wherein the at least one signal strength range determination factor includes at least one of a maximum signal strength threshold offset value, a minimum signal strength threshold offset value, and a learning time period offset value.

12. The computerized method of claim 7, wherein determining the signal strength range includes:

identifying, by the processor, a maximum signal strength value of the signal strength data stream during the learning time period;

identifying, by the processor, a minimum signal strength value of the signal strength data stream during the learning time period;

applying, by the processor, a maximum signal strength threshold offset to the maximum signal strength value to form a maximum signal strength threshold of the signal strength range; and applying, by the processor, a minimum signal strength threshold offset to the minimum signal strength value to form a minimum signal strength threshold of the signal strength range;

wherein the maximum signal strength threshold and the minimum signal strength threshold form boundaries of the signal strength range.

13. The computerized method of claim 7, wherein obtaining the initial signal strength range includes accessing, by the processor, the initial signal strength range stored on a server, wherein the accessed initial signal strength range is associated with past usage of the connected wireless access point by at least one different computing device.

14. The computerized method of claim 7, wherein the received signal strength data stream includes signal strength data from a plurality of wireless access points;

wherein the method further comprises identifying, by the processor, a wireless access point signal pattern based on the signal strength data from the plurality of wireless access points during the learning time period;

comparing, by the processor, the received signal strength data from the plurality of wireless access points to the identified wireless access point signal pattern during the detection time period; and based on the comparison of the signal strength data to the wireless access point signal pattern indicating that roaming event has occurred, resetting the signal strength range such that a learning time period is initiated and the signal strength range is redetermined.

15. The computerized method of claim 7, wherein receiving the signal strength data stream includes receiving raw signal strength data and applying a low pass filter to received raw signal strength data to form the signal strength data stream.

16. The computerized method of claim 7, wherein the learning time period is triggered by a roaming event of the computing device, wherein the roaming event indicates that the computing device has switched a connection from a first wireless access point to a second wireless access point.

17. One or more computer storage media having computer-executable instructions for detecting movement of a computing device that, upon execution by a processor, cause the processor to at least:

receive a signal strength data stream based on at least one wireless signal from a connected wireless access point;

detect an initiation of an application session of at least one application executing on the computing device that uses a connection with the connected wireless access point;

based on the detected initiation of the application session, initiate a learning time period associated with the application session on the computing device;

perform, during the learning time period:

based on the connection with the connected wireless access point used by the application session, obtain an initial signal strength range associated with the connected wireless access point, and adjust the initial signal strength range based on signal strength values of the signal strength data stream during the learning time period, the adjusted signal strength range indicating the computing device is within a defined area associated with a location of the computing device upon the initiation of the application session using the connection with the connected wireless access point;

based on completion of the learning time period, detect signal strength values of the signal strength data stream during a detection time period; and based on detecting signal strength values inside of the adjusted signal strength range during the detection time period, maintain the connection of the at least one application with the connected wireless access point or, based on detecting signal strength values outside of the adjusted signal strength range during the detection time period, disconnect the connection of the at least one application with the connected wireless access point.

18. The one or more computer storage media of claim 17, wherein, based on detecting signal strength values outside of the adjusted signal strength range, a notification is provided for display on a user interface of the computing device, the notification including a prompt requesting that a user confirm or deny that the computing device has moved outside the area associated with the connected wireless access point; and wherein the computer-executable instructions, upon execution by a processor, further cause the processor to at least:

based on receiving a user response to the prompt that confirms the computing device has moved outside the area associated with the connected wireless access point, disconnect the connection to the wireless access point used by the application session; and based on receiving a user response to the prompt that denies that the computing device has moved outside the area associated with the connected wireless access point, reinitiate the learning time period associated with the application session on the computing device.

19. The one or more computer storage media of claim 18, wherein the at least one application includes a media projection application configured for projecting interface data of the computing device to a visual projection device in a room using a connection with the connected wireless access point and the defined area is within the room; and disconnecting the connection of the at least one application includes disconnecting the connection of the projection application to the connected wireless access point, thereby disabling a current projection session of the projection application.

20. The one or more computer storage media of claim 17, wherein obtaining the initial signal strength range includes accessing, by the processor, the initial signal strength range stored on a server, wherein the accessed initial signal strength range is associated with past usage of the connected wireless access point by at least one different computing device.

\* \* \* \* \*